(No Model.)
W. G. BROWNE.
AUTOMATIC VALVE.
No. 360,141. Patented Mar. 29, 1887.
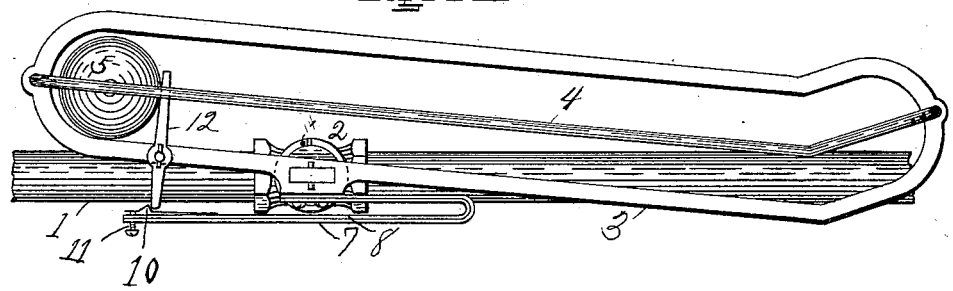
Fig. I.
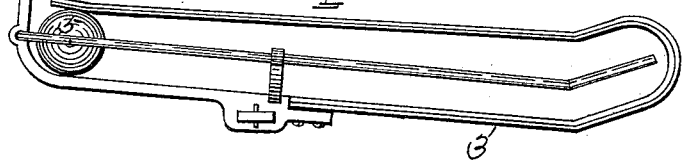
Fig. IV.
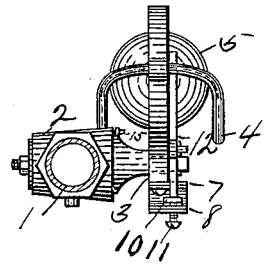
Fig. III.
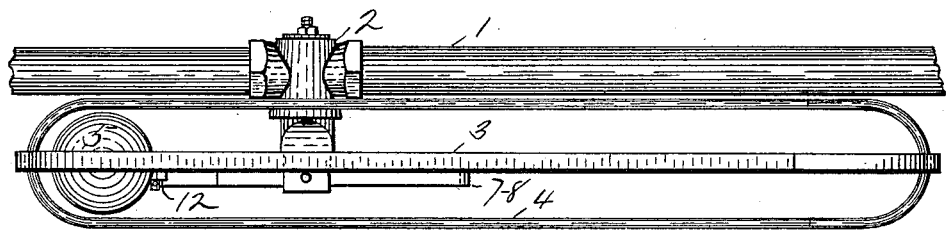
Fig. II.
Witnesses
A. P. Wood.
George H. Crafts
Inventor
Walker G. Browne
By Albert A. Wood Att'y

UNITED STATES PATENT OFFICE.

WALKER G. BROWNE, OF ATLANTA, GEORGIA, ASSIGNOR TO THE UNITED STATES AUTOMATIC WATER CUT-OFF COMPANY.

AUTOMATIC VALVE.

SPECIFICATION forming part of Letters Patent No. 360,141, dated March 29, 1887.

Application filed October 26, 1886. Serial No. 217,293. (No model.)

*To all whom it may concern:*

Be it known that I, WALKER G. BROWNE, a citizen of the United States, residing at Atlanta, in the county of Fulton and State of Georgia, have invented a new and useful Automatic Valve; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of thermal valves that are closed automatically by the springing of a compound plate that is composed of two metals having different expansive properties, the compound plate being actuated by a change of temperature, the object being to prevent the freezing of water-pipes by shutting off the supply on the approach of the freezing degree of temperature; and it consists of a valve having a lever made in the shape of a cage, in which is a ball, the cage having considerable length and being inclined, and means for retaining the ball in the highest end and to release it at the desired temperature, as will be hereinafter fully described.

In the accompanying drawings, Figure I is a side view of a pipe having a valve to which is attached my device for closing the valve. Fig. II is a top view of the same, and Fig. III is an end view showing the higher end of the cage for the ball. Fig. IV shows a modified application of the compound plate.

In these figures like reference-marks refer to like parts.

1 is a pipe, and 2 a valve, preferably of the class known as stop and waste valves. To the stem of the valve is attached a lever or beam, 3, which is preferably, though not necessarily, extended and brought together at the top, forming with the loop 4 a cage for the ball 5, in which it can roll, but from which it cannot escape. The cage for the ball is inclined downwardly from the end in which the ball is shown, that the ball may, when released, roll nearly to the opposite end of the cage, from which point the plane is inclined upwardly to the end.

Attached to the lever or beam is the compound lever 7 8, composed of two pieces, of which one, 7, is of a metal having a high expansive quality, and the other, 8, is of metal having a low expansive quality.

On the free end of the compound plate is a catch, 10, which is attached at one end to the compound plate, and is raised at the other for the purpose of adjustment by the screw 11. The lever 12 is attached to the lever or beam 3, its lower end resting against the catch 10 and its upper end extending upwardly to form a stop to prevent the ball from rolling down the inclined plane on which it rests. The pin 14 in the shell of the valve and the pin 15 in the plug prevent the valve from turning in the opening direction farther than desired.

In the modification shown in Fig. IV the lever or beam 3, forming part of the cage for the ball, is also the compound plate, the free end of which rests on the ball.

The lever or beam is so set on the stem of the valve as to insure that the plane on which the ball rests will be inclined sufficiently to cause the ball to roll, when released, to the other end of the lever, depress that end of the lever, and close the valve thereby. This depression of the long end of the lever will be greatly assisted in the start by the impact of the ball against the upward inclination of the plane on which it rolls. The ball will be released from its position at the higher end of the cage to the lower end when a sufficient change in the temperature shall have taken place to cause the compound plates, by their unequal shrinkage, to bend away from and release the lever 12, when the ball will force said lever over and roll down the inclined plane and open the valve, as described.

The operation of the modification is similar, except that I dispense with the lever 12, the compound plate bearing directly on the ball.

The valve may at any time be closed by turning the lever that is on the valve-stem, and it may be made to stay in that position by releasing the ball by hand, which will allow it to roll to the bottom end. When open, the valve may be closed by turning the valve-lever in the reverse direction, and if it is desired to have it remain closed the ball must be put in the higher end and the lever 12 be turned up and engaged with the catch 10, if the temperature is higher than that at which the valve is set to close. If not, the valve will return to the lower end of the cage and close the valve, thus preventing the valve being accidentally left open.

Having described my invention, what I claim as new, and desire to secure by Letters Patent of the United States, is—

1. In an automatic valve, the combination of a valve, an inclined actuating-lever connected with said valve, a compound plate, and a ball rolling within guides from the highest to the lowest end of said lever, which ball by its weight closes the valve, substantially as described.

2. In an automatic valve, the combination of the valve 2, the lever 3, the ball 5, a catch, and a compound plate, constructed as described, to release said ball and allow it to roll down the inclined lever and close the valve, in the manner shown and described.

3. In an automatic valve, the combination of the valve 2, the lever 3, the ball 5, the compound plate, and adjustable catch 10, substantially as described, and for the purpose specified.

In testimony whereof I affix my signature in presence of two witnesses.

WALKER G. BROWNE.

Witnesses:
W. F. CRUSSELLE,
R. A. HEMPHILL.